3,405,105
POLYMERIZATION OF TETRAHYDROFURAN AND DERIVATIVES THEREOF WITH ORGANIC SULFONIC ACIDS
Jennings P. Blackwell, Bartlesville, Okla., assignor to Phillips Petroleum Company, a corporation of Delaware
No Drawing. Filed Nov. 12, 1965, Ser. No. 507,566
10 Claims. (Cl. 260—79.3)

ABSTRACT OF THE DISCLOSURE

At least one cyclic ether is reacted with at least one organic sulfonic acid to produce a solid polymer. The cyclic ether has the formula

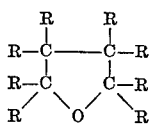

where each R is selected from the group consisting of hydrogen and alkyl, cyclo-alkyl and aryl groups and combinations thereof, the number of carbon atoms in any one R group not exceeding 8 and the total number of carbon atoms in all the R groups not exceeding 12. The acid has the formula R'SO$_3$H wherein R' is selected from the group consisting of alkyl, cycloalkyl, and aryl groups and combinations thereof, the number of carbon atoms in R' not exceeding 12. The polymer has repeating

units and R'SO$_3$— end groups.

---

This invention relates to a method for polymerizing tetrahydrofuran and its derivatives. In a specific aspect the invention relates to an improved process for the polymerization of tetrahydrofuran and its derivatives in the presence of organic sulfonic acids.

Numerous processes for the polymerization of cyclic ethers free from non-aromatic carbon-carbon double bonds, such as tetrahydrofuran and its derivatives, are well known in the art. In most of these processes, the products were oily liquids, and in the few instances where solid polymers were obtained, the solid polymer is generally unsatisfactory for use in finishes, molded objects, and the like. Accordingly, it is an object of the invention to provide an improved process for the polymerization of tetrahydrofuran and its derivatives. Another object of the invention is to provide a process for the polymerization of cyclic ethers in the presence of organic sulfonic acids. Yet another object of the invention is to provide a process for producing solid polymers of cyclic ethers which can be utilized in the manufacture of molded articles and the like. Other objects, aspects and advantages will be apparent from a study of the disclosure and the appended claims to the invention.

In accordance with this invention, a cyclic ether having the formula

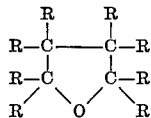

is cleaved and polymerized to a high molecular weight polymer by contacting said ether with an organic sulfonic acid having the formula R'SO$_3$H, where each R is selected from the group consisting of hydrogen and alkyl, cycloalkyl, and aryl radicals, and combinations thereof such as alkaryl radicals, aralkyl radicals, and the like; and R' is selected from the group consisting of alkyl, cycloalkyl, and aryl radicals, and combinations thereof such as alkaryl radicals, aralkyl radicals, and the like; and wherein the number of carbon atoms in any one R group preferably does not exceed 8, the total number of carbon atoms in all of said R groups in the cyclic ether preferably does not exceed 12, and the number of carbon atoms in the R' group preferably does not exceed 12. The polymers thus produced having repeating —CR$_2$CR$_2$CR$_2$CR$_2$O— units. The polymer molecule has R'SO$_3$— end groups derived from the organic sulfonic acid.

Representative examples of cyclic ethers within the above formula include tetrahydrofuran
tetrahydro-2-methylfuran
tetrahydro-3-ethylfuran
tetrahydro-2-isopropylfuran
tetrahydro-3-tert-butylfuran
tetrahydro-2-isopentylfuran
tetrahydro-3-hexylfuran
tetrayhdro-2-octylfuran
tetrahydro-2,5-dihexylfuran
tetrahydro-3-cyclohexylfuran
tetrahydro-2-(cyclopentylmethyl)furan
tetrahydro-3-phenylfuran
tetrahydro-2-benzylfuran
tetrahydro-3-p-tolylfuran
tetrahydro-3-methyl-4-phenylfuran
tetrahydro-1,2,3,4-tetramethylfuran and the like, and mixtures thereof.

Representative examples of organic sulfonic acids which can be utilized in the process of the invention include methanesulfonic acid
ethanesulfonic acid
propanesulfonic acid
butanesulfonic acid
hexanesulfonic acid
octanesulfonic acid
dodecanesulfonic acid
2-methylbutanesulfonic acid
3,4-diethylhexanesulfonic acid
cyclopentanesulfonic acid
cyclohexylmethanesulfonic acid
3-ethylcyclopentanesulfonic acid
benzenesulfonic acid
p-toluenesulfonic acid
α-toluenesulfonic acid and the like, and mixtures thereof.

In the process of this invention, the mol ratio of organic sulfonic acid to cyclic ether should be at least 1:200, preferably being within the range of about 1:40 to about 1:2.5. Although the temperature at which the polymerization is conducted can be varied over a wide range, it will generally be within the range of about 0 to 200° C., usually being within the range of about 20 to 65° C. The reaction time can vary considerably, depending in part on the reaction temperature, but will generally be within the range of about 1 minute to about 24 hours, usually being within the range of about 10 minutes to about 8 hours. Although no added solvent is required, a solvent which does not react appreciably with any of the components of the mixture can be employed. Examples of solvents which can be employed include ethers, alcohols, hydrocarbons, particularly aromatic hydrocarbons, dimethyl sulfoxide, and the like. The pressure need be only sufficient to maintain the reactants and/or solvent substantially in the liquid state.

The polymers of this invention are readily recovered from the reaction mixture by conventional methods, e.g., by dilution of the reaction mixture with water, followed by removal of the polymer by filtration or other suitable separation process.

The polymers of this invention can be used for the manufacture of films and fibers, for the production of molded articles where the polymer can be molded alone or with fillers, dyes, reinforcing agents, e.g., glass or asbestos fibers, etc., and in coating compositions in which the polymers can be used clear or pigmented on wood, metal, etc.

The following example is presented in further illustration of the invention and should not be construed to unduly limit the invention.

Example

To 200 ml. (2.48 mols) of tetrahydrofuran was added slowly with stirring, without external heating or cooling, 130 g. (0.87 mol) of cyclopentanesulfonic acid freshly prepared by the reaction of sulfur dioxide and oxygen with cyclopentane. The mixture was then stirred for 5 hours at room temperature, after which it was stored overnight in a refrigerator. The mixture was then added to 1 liter of cold water, with stirring. The resulting mixture was allowed to stand, after which a light-colored solid was skimmed from the surface of the water. This solid was washed with a saturated aqueous solution of sodium chloride and with cold water. The dried solid, which weighed 16 g., had a number average molecular weight of approximately 100,000, as determined by a light scattering technique. Elemental analysis of this solid showed the polymer contained 62.2 weight percent carbon, 9.5 weight percent hydrogen, and 0.2 weight percent sulfur, compared with theoretical values of 66.7 weight percent carbon, 11.2 weight percent hydrogen, and 0.6 weight percent sulfur for a polymer having a molecular weight of 100,000 and having the formula

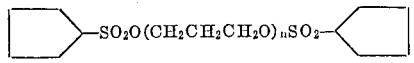

$n$ having the value of approximately 1385. The infrared spectrum of the polymer was consistent with that to be expected for a compound having the above structure, i.e., for a polyether having

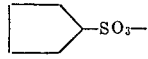

end groups.

A similar polymer prepared in another run carried out under similar conditions was found to be soluble in ethyl alcohol. This polymer, upon heating, changed to a glass-like substance, without melting, at 30 to 32° C.

Reasonable variations and modifications are possible within the scope of the foregoing disclosure and the appended claims to the invention.

I claim:

1. A process for polymerizing at least one cyclic ether having the formula

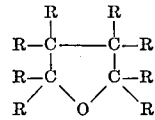

wherein each R is selected from the group consisting of hydrogen and alkyl, cycloalkyl and aryl groups and combinations thereof, the number of carbon atoms in any one R group not exceeding 8 and the total number of carbon atoms in all the R groups in the cyclic ether not exceeding 12; comprising reacting said cyclic ether with at least one organic sulfonic acid having the formula R'SO$_3$H, wherein R' is selected from the group consisting of alkyl, cycloalkyl, and aryl groups and combinations thereof, the number of carbon atoms in R' not exceeding 12.

2. A process in accordance with claim 1 wherein the mol ratio of said organic sulfonic acid to said cyclic ether is at least 1:200.

3. A process in accordance with claim 1 wherein the mol ratio of said organic sulfonic acid to said cyclic ether is in the range of 1:40 to 1:2.5.

4. A process in accordance with claim 1 wherein the reaction is carried out at a temperature in the range of 0° C. to 200° C. and a pressure sufficient to maintain the reactants in the liquid state.

5. A process in accordance with claim 1 wherein the reaction is carried out at a temperature in the range of 20° C. to 65° C. and a pressure sufficient to maintain the reactants in the liquid state, for a time in the range of 1 minute to 24 hours.

6. A process in accordance with claim 1 wherein the reaction is carried out in the presence of a solvent.

7. A process in accordance with claim 1 further comprising recovering a solid polymer.

8. A process in accordance with claim 7 wherein said polymer has repeating —CR$_2$CR$_2$CR$_2$CR$_2$O— units and R'SO$_3$— end groups.

9. A process in accordance with claim 1 wherein said cyclic ether is tetrahydrofuran and said organic sulfonic acid is cyclopentanesulfonic acid.

10. A process in accordance with claim 3 wherein the reaction is carried out at a temperature in the range of 20° C. to 65° C., and a pressure sufficient to maintain the reactants in the liquid state, for a time in the range of 10 minutes to 8 hours, said cyclic ether is tetrahydrofuran and said organic sulfonic acid is cyclopentanesulfonic acid, and further comprising recovering a solid polymer.

References Cited

UNITED STATES PATENTS 2,843,568　7/1958　Benning et al.
3,328,362　6/1967　Roberts et al. _____ 260—79.3

OTHER REFERENCES

Gaylord: Polyethers, Part I, p. 300, 1963, copy in 260 2 Ep lit.

JOSEPH L. SCHOFER, *Examiner.*

D. K. DENENBERG, *Assistant Examiner.*